US012567406B2

(12) United States Patent
Qi

(10) Patent No.: US 12,567,406 B2
(45) Date of Patent: Mar. 3, 2026

(54) VOICE RECOGNITION SYSTEM BASED ON AN INTENDED ACTION OF AN OCCUPANT

(71) Applicant: GM Global Technology Operations LLC, Detroit, MI (US)

(72) Inventor: Wenyuan Qi, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 191 days.

(21) Appl. No.: 18/414,693

(22) Filed: Jan. 17, 2024

(65) Prior Publication Data

US 2025/0218432 A1    Jul. 3, 2025

(30) Foreign Application Priority Data

Dec. 28, 2023    (CN) .......................... 202311836062.1

(51) Int. Cl.
*G10L 15/22*        (2006.01)
*G06F 40/284*        (2020.01)
(Continued)

(52) U.S. Cl.
CPC ........ *G10L 15/1822* (2013.01); *G06F 40/284* (2020.01); *G06F 40/295* (2020.01); *G06F 40/30* (2020.01); *G10L 15/16* (2013.01); *G10L 15/18* (2013.01); *G10L 15/1815* (2013.01); *G10L 15/22* (2013.01); *G06F 40/289* (2020.01); *G10L 15/183* (2013.01); *G10L 2015/223* (2013.01);
(Continued)

(58) Field of Classification Search
None
See application file for complete search history.

(56) References Cited

U.S. PATENT DOCUMENTS 8,700,332 B2 * 4/2014 Neugebauer ....... G01C 21/3608
701/539
9,250,703 B2 * 2/2016 Hernandez-Abrego .....................
A63F 13/10
(Continued)

FOREIGN PATENT DOCUMENTS

CN        120012787 A  *  5/2025  ........... G06N 3/0455
WO    WO-2021189851 A1 *  9/2021  ........... G06F 40/279

OTHER PUBLICATIONS

IP.com translation of CN-120012787-A. (Year: 2023).*
(Continued)

*Primary Examiner* — Richard Z Zhu
(74) *Attorney, Agent, or Firm* — Vivacqua Crane, PLLC

(57)        ABSTRACT

A voice recognition system includes one or more controllers that receive an electrical signal representative of a voice signal generated by an occupant and image data representative of a head and an upper body of the occupant. The controllers convert the electrical signal representative of the words spoken by the occupant into a sequence of tokens based on a supervised multicategory machine learning algorithm, generates one or more sentences based on the sequence of tokens, and executes one or more eye and body tracking algorithms to determine one or more occupant intent factors. The controllers determine an intended action of the occupant based on the occupant intent factors and a context of the voice signal generated by the occupant. The controllers determine a hands-free task based on the context of the voice signal generated by the occupant, the intended action, and the one or more sentences.

16 Claims, 3 Drawing Sheets

(51) Int. Cl.
  *G06F 40/295*    (2020.01)
  *G06F 40/30*     (2020.01)
  *G10L 15/16*     (2006.01)
  *G10L 15/18*     (2013.01)
  *G06F 40/289*     (2020.01)
  *G10L 15/183*     (2013.01)

(52) U.S. Cl.
  CPC .. *G10L 2015/226* (2013.01); *G10L 2015/227*
                  (2013.01)

(56)       References Cited

U.S. PATENT DOCUMENTS

| | | | | |
|---|---|---|---|---|
| 9,418,653 | B2* | 8/2016 | Sekiguchi | G06F 3/013 |
| 10,395,653 | B2* | 8/2019 | Ikeno | G10L 15/24 |
| 10,839,583 | B2* | 11/2020 | Filev | B60W 50/10 |
| 10,867,607 | B2* | 12/2020 | Ikeno | G10L 15/08 |
| 2009/0055824 | A1* | 2/2009 | Rychtyckyj | G06F 3/011 |
| | | | | 718/101 |
| 2012/0295708 | A1* | 11/2012 | Hernandez-Abrego | ..................... |
| | | | | B60K 35/10 |
| | | | | 463/36 |
| 2019/0108257 | A1* | 4/2019 | Lefebure | G06F 40/211 |
| 2022/0245970 | A1* | 8/2022 | Jung | G10L 15/22 |
| 2025/0201247 | A1* | 6/2025 | Gupta | G10L 15/22 |

OTHER PUBLICATIONS

Google translation of Office Action issued in DE102024104356 dated Aug. 8, 2024 (Year: 2024).*
IP.com translation of WO-2021189851-A1 (Year: 2021).*

* cited by examiner

VOICE RECOGNITION SYSTEM BASED ON AN INTENDED ACTION OF AN OCCUPANT

CROSS-REFERENCE TO RELATED APPLICATIONS

This application claims the benefit of foreign priority under 35 U.S.C. § 119 of Chinese patent application number 2023118360621, filed on Dec. 28, 2023. The contents of this application are incorporated herein by reference in their entirety.

INTRODUCTION

The present disclosure relates to a voice recognition system that determines a hands-free task based on at least a voice signal created by an occupant of the vehicle and an intended action of the occupant, where the intended action is determined based on image data captured by an occupant monitoring system.

Many vehicles include in-cabin voice recognition systems that allow for a driver or an occupant of the vehicle to interact with various in-vehicle technologies based on speech commands. Although voice recognition systems allow for hands-free operation of various in-vehicle technologies, it is to be appreciated that voice recognition systems include several drawbacks as well. For example, some voice recognition systems may have issues with accurately identifying the identity of an occupant. As another example, some voice recognition systems may have issues accurately interpreting the commands spoken by the occupant as well. Furthermore, some voice recognition systems may have difficulties in identifying when a wake-up command is uttered by one of the occupants because of background noise. As a result, the occupant may have to utter the wake-up command several times, and therefore may not be able to have a continuous conversation with the voice recognition system.

Thus, while current voice recognition systems achieve their intended purpose, there is a need in the art for improved accuracy when determining a hands-free task by a voice recognition system.

SUMMARY

According to several aspects, a voice recognition system is disclosed and includes one or more controllers that each include one or more processors that execute instructions to receive an electrical signal representative of a voice signal generated by an occupant and image data representative of a head and an upper body of the occupant. The one or more controllers convert the electrical signal representative of the words spoken by the occupant into a sequence of tokens based on a supervised multicategory machine learning algorithm, where the sequence of tokens includes two or more tokens. The one or more controllers generate one or more sentences based on the sequence of tokens. The one or more controllers execute one or more eye and body tracking algorithms to determine one or more occupant intent factors based on the image data representative of the head and the upper body of the occupant. The one or more controllers execute one or more regression machine learning algorithms to determine an intended action of the occupant based on one or more of the occupant intent factors. The one or more controllers determine a context of the voice signal generated by the occupant based on the intended action, the one or more sentences, and a mood of the occupant. The one or more controllers execute one or more pattern recognition algorithms to determine a hands-free task based on the context of the voice signal generated by the occupant, the intended action, and the one or more sentences.

In another aspect, the voice recognition system includes one or more peripheral systems in electronic communication with the one or more controllers, wherein the one or more processors of the one or more controllers instruct one of the peripheral systems to execute the hands-free task.

In yet another aspect, the occupant is located within an interior cabin of a vehicle.

In an aspect, the one or more peripheral systems include one or more of the following: a heating, ventilation, and air conditioning (HVAC) system, a radio, an autonomous driving system, a navigation system, an infotainment system, a lighting system, a personal electronic device, and an intelligent seating system that communicates with the occupant based on haptic feedback.

In another aspect, the voice recognition system further includes a microphone in electronic communication with the one or more controllers that converts the voice signal generated by the occupant into the electrical signal representative of the voice signal.

In yet another aspect, the one or more processors of the one or more controllers execute instructions to continuously monitor the microphone for the electrical signal representative of the voice signal generated by the occupant.

In an aspect, the voice recognition system further includes an occupant monitoring system including an occupant monitoring system camera in electronic communication with the one or more controllers, where the occupant monitoring system camera is positioned to capture image data representative of a head and an upper body of the occupant.

In another aspect, each token is assigned a confidence level.

In yet another aspect, the one or more processors of the one or more controllers execute instructions to compare the confidence level of each token that is part of the sequence of tokens with a threshold confidence level, in response to determining the confidence level of a specific token of the sequence of tokens is less than the threshold confidence level, mask the specific token to create a missing token, execute one or more large language models to predict the contents of the missing token based on context of adjacent tokens that are part of the sequence of tokens, and determine the contents of the missing token based on one or more machine learning algorithms to complete the one or more sentences.

In an aspect, the large language model is the bidirectional encoder representations from transformers (BERT) model.

In another aspect, the one or more machine learning algorithms is a long short-term memory (LSTM) model.

In yet another aspect, the occupant intent factors include one or more of the following: a point of gaze, a touch point, one or more gestures, and a body position of the occupant.

In an aspect, the context of the voice signal generated by the occupant is determined based on one or more of the following: current traffic conditions, a current date, a current time, and a conversation history.

In another aspect, the one or more processors of the one or more controllers execute instructions to determine the mood of the occupant by analyzing the voice signal generated by the occupant based on a trained regression model.

In yet another aspect, the one or more processors of the one or more controllers execute instructions to execute one or more history-based large language models to predict an upcoming voice command uttered by the occupant based on a conversation history of the occupant.

In an aspect, a method for determining a hands-free task by a voice recognition system is disclosed. The method includes receiving, by one or more controllers, an electrical signal representative of a voice signal generated by an occupant and image data representative of a head and an upper body of the occupant. The method includes converting, by the one or more controllers, the electrical signal representative of the words spoken by the occupant into a sequence of tokens based on a supervised multicategory machine learning algorithm, where the sequence of tokens includes two or more tokens. The method includes generating, by the one or more controllers, one or more sentences based on the sequence of tokens. The method also includes executing, by the one or more controllers, one or more eye and body tracking algorithms to determine one or more occupant intent factors based on the image data representative of the head and the upper body of the occupant. The method further includes executing, by the one or more controllers, one or more regression machine learning algorithms to determine an intended action of the occupant based on one or more of the occupant intent factors. The method includes determining a context of the voice signal generated by the occupant based on the intended action, the one or more sentences, and a mood of the occupant. Finally, the method includes executing one or more pattern recognition algorithms to determine a hands-free task based on the context of the voice signal generated by the occupant, the intended action, and the one or more sentences.

In another aspect, the method includes instructing a peripheral system to execute the hands-free task.

In yet another aspect, a voice recognition system for a vehicle is disclosed. The voice recognition system includes a microphone that converts a voice signal generated by an occupant of the vehicle into an electrical signal representative of the voice signal, an occupant monitoring system including an occupant monitoring system camera positioned to capture image data representative of a head and an upper body of the occupant, and one or more controllers in electronic communication with the microphone and the occupant monitoring system camera. The one or more controllers each include one or more processors that execute instructions to convert the electrical signal representative of the words spoken by the occupant into a sequence of tokens based on a supervised multicategory machine learning algorithm, where the sequence of tokens includes two or more tokens. The one or more controllers generate one or more sentences based on the sequence of tokens. The one or more controllers execute one or more eye and body tracking algorithms to determine one or more occupant intent factors based on the image data representative of the head and the upper body of the occupant. The one or more controllers execute one or more regression machine learning algorithms to determine an intended action of the occupant based on one or more of the occupant intent factors. The one or more controllers determine a context of the voice signal generated by the occupant based on the intended action, the one or more sentences, and a mood of the occupant and executes one or more pattern recognition algorithms to determine a hands-free task based on the context of the voice signal generated by the occupant, the intended action, and the one or more sentences.

In another aspect, the voice recognition system further includes one or more peripheral systems in electronic communication with the one or more controllers, where the one or more processors of the one or more controllers instruct one of the peripheral systems to execute the hands-free task.

In yet another aspect, the one or more peripheral systems include one or more of the following: a heating, ventilation, and air conditioning (HVAC) system, a radio, an autonomous driving system, a navigation system, an infotainment system, a lighting system, a personal electronic device, and an intelligent seating system that communicates with the occupant based on haptic feedback.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
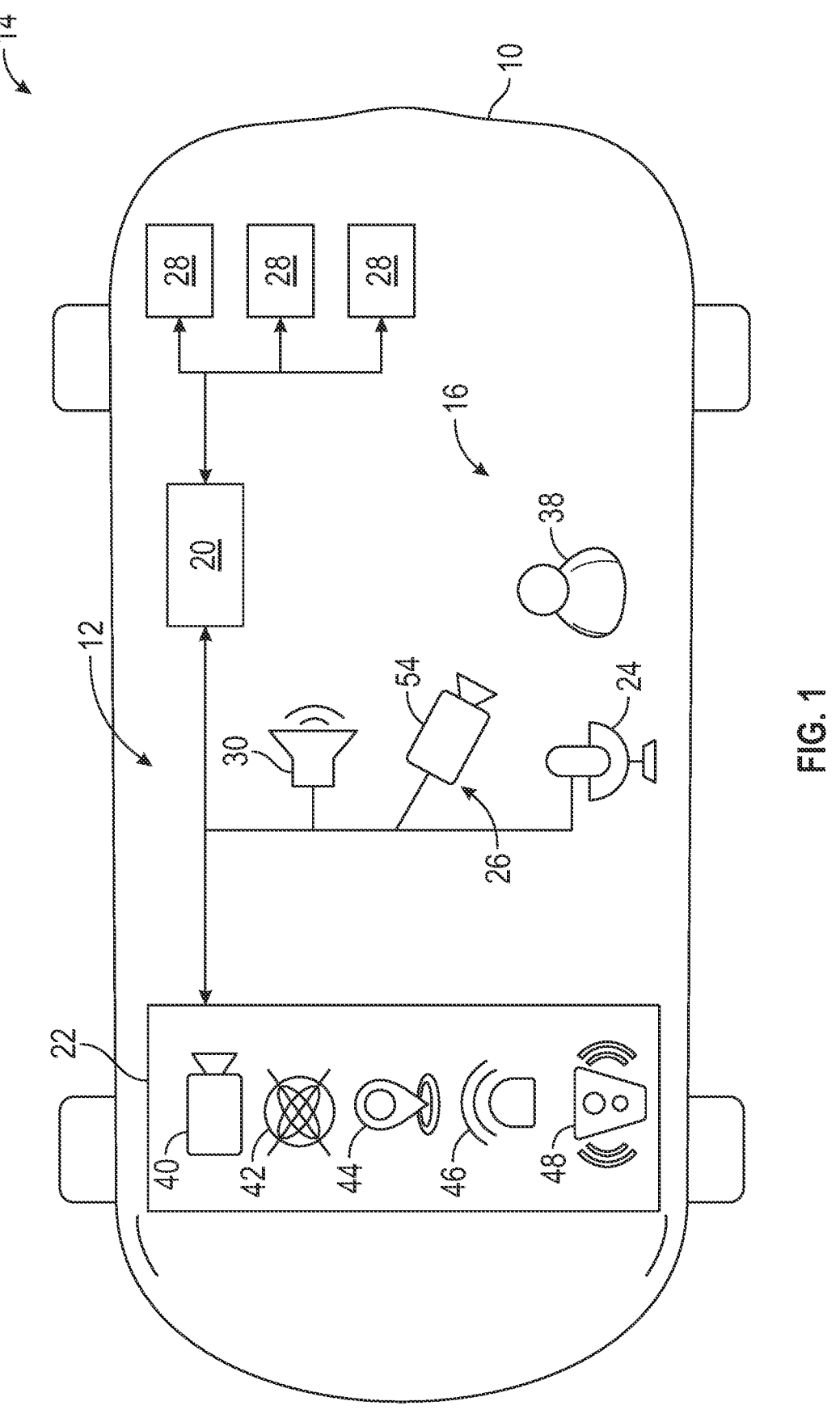
FIG. 1 illustrates a schematic diagram of a vehicle including the disclosed voice recognition system that includes one or more controllers in electronic communication with a microphone and an occupant monitoring system, according to an exemplary embodiment.

Referring to FIG. 1, a vehicle 10 including the disclosed voice recognition system 12 is illustrated. It is to be appreciated that the vehicle 10 may be any type of vehicle such as, but not limited to, a sedan, a truck, sport utility vehicle, van, or motor home. In the non-limiting embodiment as shown in FIG. 1, the voice recognition system 12 includes one or more controllers 20 in electronic communication with a plurality of perception sensors 22, a microphone 24, an occupant monitoring system 26, one or more peripheral systems 28 for executing a hands-free task, and a speaker 30. It is to be appreciated that while FIG. 1 illustrates the voice recognition system 12 as part of a vehicle, the voice recognition system 12 is not limited to a vehicle and may be used in a variety of other applications as well. For example, in another embodiment, the voice recognition system 12 may be used in a building such as a home or an office instead.

As explained below, the one or more controllers 20 of the voice recognition system 12 instruct the one or more peripheral systems 28 to execute a hands-free task as indicated by one or more individuals or occupants 38 located within an interior cabin 16 of the vehicle 10. In one embodiment, the one or more peripheral systems 28 include any vehicle system or subsystem such as, but not limited to, a heating, ventilation, and air conditioning (HVAC) system, a radio, an autonomous driving system, a navigation system, an infotainment system, a lighting system, and an intelligent seating system that communicates with the occupant 38 based on haptic feedback. In the event the voice recognition system 12 is part of a building such as a residence, then the occupant

38 is located within a room or other enclosed space within the building instead, and the one or more peripheral systems 28 may include a lighting system, home appliances such as a television or refrigerator, and an HVAC system. In one embodiment, the one or more peripheral systems 28 may include a personal electronic device of an occupant 38 of the vehicle 10, where the personal electronic device is wirelessly connected to the one or more controllers 20. The portable electronic device may be, for example, a smartphone, smartwatch, or a tablet computer.

The hands-free task is any type of operation that the occupant 38 traditionally performs using his or her hands, but now the voice recognition system 12 instructs the one or more peripheral systems 28 to execute the hands-free task instead, without having the occupant 38 perform the operation manually. For example, if the peripheral system 28 is a radio, then the hands-free task may include turning the radio on, selecting a specific audio file for the radio to play, or selecting a specific radio channel or station. In another example, if the peripheral system 28 is a smartphone, then the hands-free task is sending a text message or making a telephone call. The disclosed voice recognition system 12 determines a hands-free task based on at least a voice signal created by the occupant 38 of the vehicle 10 and an intended action of the occupant 38 determined by the occupant monitoring system 26. As explained below, the hands-free task may also be determined based on other inputs as well such as traffic conditions, a date and time, and a conversation history as well. The voice signal is captured by the microphone 24 and the intended action of the occupant 38 is determined based on image data captured by an occupant monitoring system camera 54 that is part of the occupant monitoring system 26.

The plurality of perception sensors 22 are configured to collect perception data indicative of an exterior environment 14 surrounding the vehicle 10. In the non-limiting embodiment as shown in FIG. 1, the plurality of perception sensors 22 include one or more cameras 40 that capture image data representative of the exterior environment 14, an inertial measurement unit (IMU) 42, a global positioning system (GPS) 44, radar 46, and LiDAR 48, however, is to be appreciated that additional sensors may be used as well. The microphone 24 represents a device that converts sound waves into electrical signals, where the electrical signals are received by the one or more controllers 20. Specifically, the microphone 24 converts a voice signal generated by the occupant 38 of the vehicle 10 into an electrical signal representative of the voice signal. The occupant monitoring system 26 includes the occupant monitoring system camera 54 that is positioned to capture image data representative of the head and the upper body of the occupant 38 of the vehicle 10.

Figure 2:
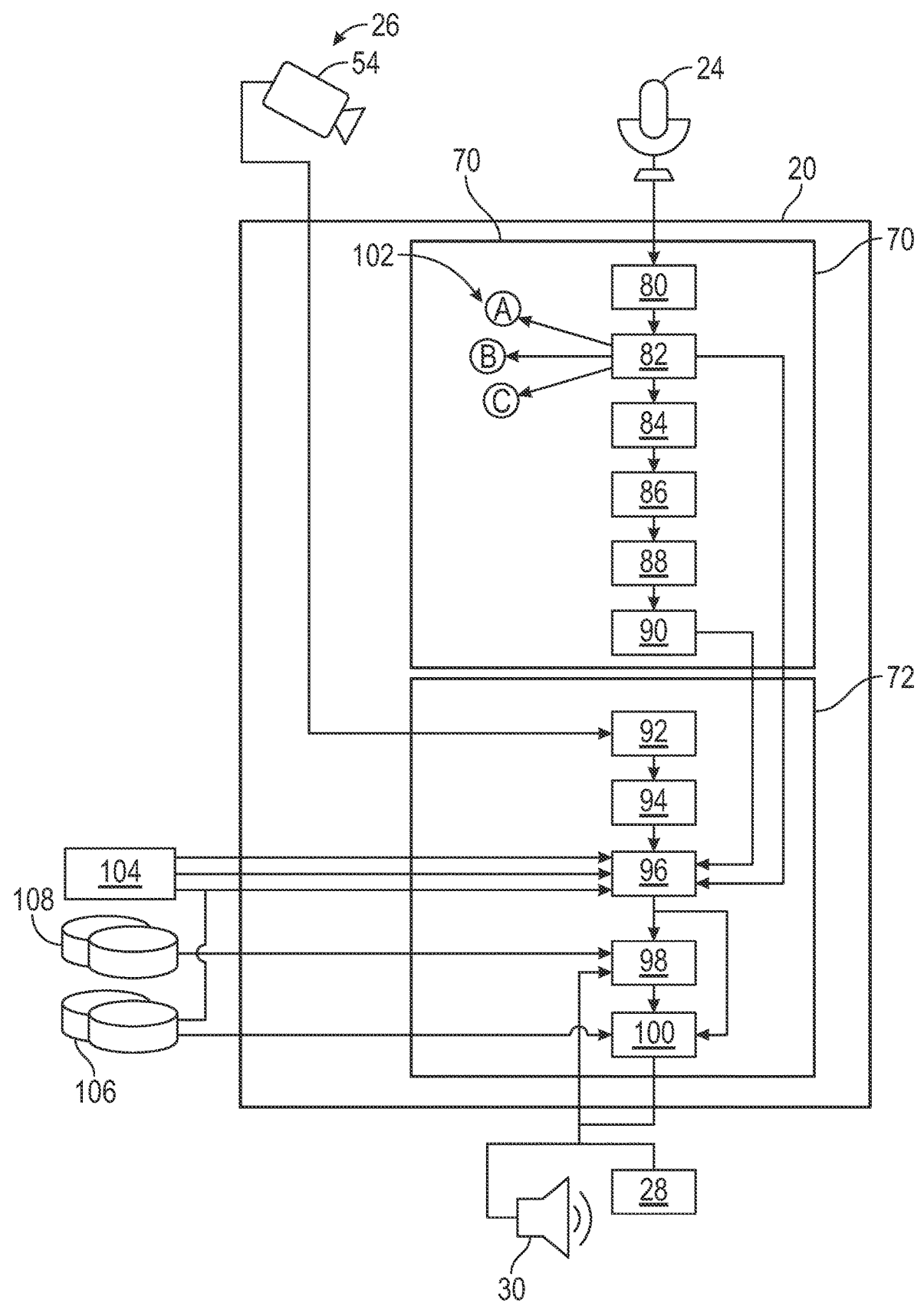
FIG. 2 is a block diagram illustrating the software architecture of the one or more controllers shown in FIG. 1, according to an exemplary embodiment.

FIG. 2 illustrates the software architecture of the one or more controllers 20 shown in FIG. 1. The one or more controllers 20 of the voice recognition system 12 include a voice block 70 and an intent block 72. The voice block 70 of the one or more controllers 20 includes a noise reduction module 80, a voice recognition module 82, a token generation module 84, a masking module 86, a prediction module 88, and a sentence generation module 90. The intent block 72 of the one or more controllers 20 includes a behavior detection module 92, an intention module 94, a context module 96, a response generation module 98, and a prediction module 100.

The voice block 70 of the one or more controllers 20 receives the electrical signal representative of the voice signal from the microphone 24, where the voice signal is indicative of one or more words spoken by the occupant 38 (FIG. 1) as input. As explained below, the voice block 70 determines one or more sentences representative of the words spoken by the occupant 38 based on the voice signal. The noise reduction module 80 of the voice block 70 continuously monitors the microphone 24 for the electrical signal representative of the voice signal generated by the occupant 38. Therefore, it is to be appreciated that the voice recognition system 12 does not require an individual to utter an activation or wake-up command. The noise reduction module 80 executes one or more noise reduction algorithms that reduce background noise from the electrical signal representative of the voice signal generated by the occupant 38. One example of a noise reduction algorithm that may be used is Fourier analysis.

The voice recognition module 82 of the voice block 70 receives the electrical signal representative of the voice signal generated by the occupant 38 from the noise reduction module 80. The voice recognition module 82 executes one or more background noise recognition algorithms that extract background noise in the electrical signal representative of the voice signal generated by the occupant 38. Some examples of background noise include, but are not limited to, engine noise, road noise that is based on the specific type of road materials, environmental noise, or music or other sound files emitted by a radio. Environmental noise may include background noise from sources such as, for example, highways, airports, shopping areas, and urban areas. One example of a background noise recognition algorithm is a machine learning based model that is trained to identify and extract background noises from the electrical signal representative of the voice signal generated by the occupant 38.

The voice recognition module 82 also executes one or more speaker recognition algorithms that determine when more than one individual or occupant of the vehicle 10 generates the voice signal. In response to determining more than one individual generates the voice signal, the one or more speaker recognition algorithms then identifies different individual by a corresponding identity 102. In the example as shown, there is a first individual A, a second individual B, and a third individual C.

The token generation module 84 of the voice block 70 converts the electrical signal representative of the words spoken by the occupant 38 received from the voice recognition module 82 into a sequence of tokens based on a supervised multicategory machine learning algorithm, where the sequence includes two or more tokens. Each token represents a word or a portion of a word, or punctuation. In another implementation, the token is an index number that is mapped to a word database. It is to be appreciated that each token of the sequence of tokens is assigned a confidence level, where a higher confidence level indicates the token accurately represents a word spoken by the occupant 38 (FIG. 1).

The masking module 86 of the voice block 70 then compares the confidence level of each token that is part of the sequence of tokens with a threshold confidence level. The threshold confidence level is based on a target accuracy of the voice recognition system 12. In response to determining a specific token of the sequence of tokens includes a confidence level that is less than the threshold confidence, the masking module 86 of the voice block 70 masks the specific token to create a missing token.

The prediction module 88 of the voice block 70 then executes one or more large language models to predict the contents of the missing token based on context of adjacent tokens that are part of the sequence of tokens. One example of a large language model that may be used is the bidirectional encoder representations from transformers (BERT) model, however, it is to be appreciated that other large language models may be used as well. It is to be appreciated that in some embodiments, the contents of the missing token may not be accurately predicted based on the large language model.

The sentence generation module 90 of the voice block 70 generates one or more sentences based on the sequence of tokens received from the large language model. In the event the sequence of tokens includes a missing token, the sentence generation module 90 may determine the contents of the missing token based on one or more machine learning algorithms to complete the one or more sentences. Specifically, in one embodiment, the sentence generation module 90 determines the contents of the missing token based on a long short-term memory (LSTM) model to complete the one or more sentences representative of the words spoken by the occupant 38.

The intent block 72 of the one or more controllers 20 receives the one or more sentences determined by the voice block 70 and the image data representative of the head and the upper body of the occupant 38 (FIG. 1) of the vehicle 10 from the occupant monitoring system camera 54 as input. The intent block 72 determines the hands-free command based on at least the voice signal created by the occupant 38 of the vehicle 10 and the image data captured by the occupant monitoring system camera 54 of the occupant monitoring system 26. As explained below, the hands-free task may also be determined based on other inputs as well such as traffic conditions, a date and time, and a conversation history as well. In one embodiment, the intent block 72 may determine the hands-free task without voice-based input from the occupant 38. That is, in one embodiment, the intent block 72 may determine the hands-free task based on the image data captured by the occupant monitoring system camera 54 of the occupant monitoring system 26, without the voice signal created by the occupant 38 of the vehicle 10.

The behavior detection module 92 of the intent block 72 receives the image data representative of the head and the upper body of the occupant 38 captured by the occupant monitoring system camera 54 of the occupant monitoring system 26 as input. The behavior detection module 92 of the intent block 72 executes one or more eye and body tracking algorithms to determine one or more occupant intent factors based on the image data representative of the head and the upper body of the occupant 38. The occupant intent factors may include one or more of the following: a point of gaze, a touch point, one or more gestures, and a body position of the occupant 38. The point of gaze of the occupant 38 indicates the motion of an eye relative to the head and represents where the occupant 38 is looking. The touch point indicates a component that the occupant 38 is contacting. For example, the occupant 38 may use his or her hands to manipulate the knobs of the HVAC system to change the in-cabin temperature. The gestures represent movements made by the head and hands of the occupant 38 to express an idea. The body position of the occupant 38 indicates a state of mind of the occupant 38. For example, the body position may indicate when the occupant 38 is relaxed or agitated.

The intention module 94 of the intent block 72 determines the intended action of the occupant 38 based on one or more of the occupant intent factors (the point of gaze, the touch point, the one or more gestures, and the body position of the occupant 38 received from the behavior detection module

92) by executing one or more regression machine learning algorithms. The intended action of the occupant 38 may be expressed as an intention set, where the intention set indicates the intended action and at least one of the following: the touch point, the one or more gestures, and the body position of the occupant 38 and is expressed as: {intended action|point of gaze|touch point|one or more gestures|body position}. For example, if the occupant 38 feels anxiety because they are too hot and wish to adjust the in-cabin temperature, then the intention set may be expressed as: {adjust in-cabin temperature|gazing at HVAC knobs|body of occupant tense}.

The context module 96 of the intent block 72 receives at least the intended action from the intent module 94, the one or more sentences from the voice block 70, and the electrical signal representative of the voice signal generated by the occupant 38 from the voice recognition module 82. As seen in FIG. 2, in one embodiment, the context module 96 of the intent block 72 also receives current traffic conditions, a date, and a time from one or more remaining controllers 104 that are part of the vehicle 10. The traffic conditions indicate the current traffic the vehicle 10 is experiencing and the date and time indicate a current date and a current time. In one embodiment, the context module 96 is in electronic communication with one or more history databases 106, where the history databases 106 stores a conversation history of the occupant 38. The conversation history of the occupant 38 indicates previous conversations that have been captured by the microphone 24 and analyzed by the one or more controllers 20 to determine the hands-free tasks.

The context module 96 of the intent block 72 executes one or more machine leaning algorithms to determine a context of the electrical signal representative of the voice signal generated by the occupant 38 based on the intended action from the intent module 94, the one or more sentences from the voice block 70, current traffic conditions (if applicable), the current date (if applicable), the current time (if applicable), the conversation history of the occupant 38 (if applicable), and a mood of the occupant. The machine learning algorithms may include, but are not limited to, an LSTM model or a prediction-based machine learning model. The context module 96 determines the mood of the occupant 38 by analyzing the electrical signal representative of the voice signal generated by the occupant 38 based on a trained regression model. It is to be appreciated that the trained regression model is trained based on voice signals created by the occupant 38.

The response generation module 98 of the intent block 72 receives the context of electrical signal representative of the voice signal generated by the occupant 38 from the context module 96, the intended action from the intent module 94, the one or more sentences from the voice block 70, and the conversation history of the occupant 38 (if applicable) as input. The response generation module 98 of the intent block 72 executes one or more pattern recognition algorithms that determine the hands-free task based on the input within a constrained duration of time. In an embodiment, the constrained duration of time is about 10 milliseconds. Specifically, the pattern recognition algorithms compare current values for the context of electrical signal representative of the voice signal generated by the occupant 38, the intended action, the one or more sentences, and the conversation history of the occupant 38 with a previously determined hands-free task stored in one or more historical hands-free databases 108. The one or more historical hands-free databases 108 indicate a corresponding context of the electrical signal representative of the voice signal generated by the occupant 38, a corresponding intended action, a corresponding one or more sentences, and a corresponding conversation history of the occupant 38 for each previously determined hands-free task.

The response generation module 98 then instructs the one or more peripheral systems 28 to execute the hands-free task. In one embodiment, the response generation module 98 may also instruct the speaker 30 to announce the hands-free task based on a synthetic or computer-generated audio output that represents human voice.

The prediction module 100 of the intent block 72 executes one or more history-based large language models to predict an upcoming voice command uttered by the occupant 38 based on the conversation history of the occupant 38 stored in the one or more history databases 106. In one embodiment, the prediction module 100 of the intent block 72 may then instruct the speaker 30 to announce the announce the upcoming command. In the event the upcoming voice command indicates the occupant 38 is requesting a hands-free task, then the prediction module 100 instructs a human-machine interface (HMI) such as a touchscreen to generate instructions requesting the occupant 38 to confirm the hands-free task. In response to receiving a confirmation by the occupant 38, the prediction module 100 also instructs the one or more peripheral systems 28 to execute the hands-free task as well.

Figure 3:
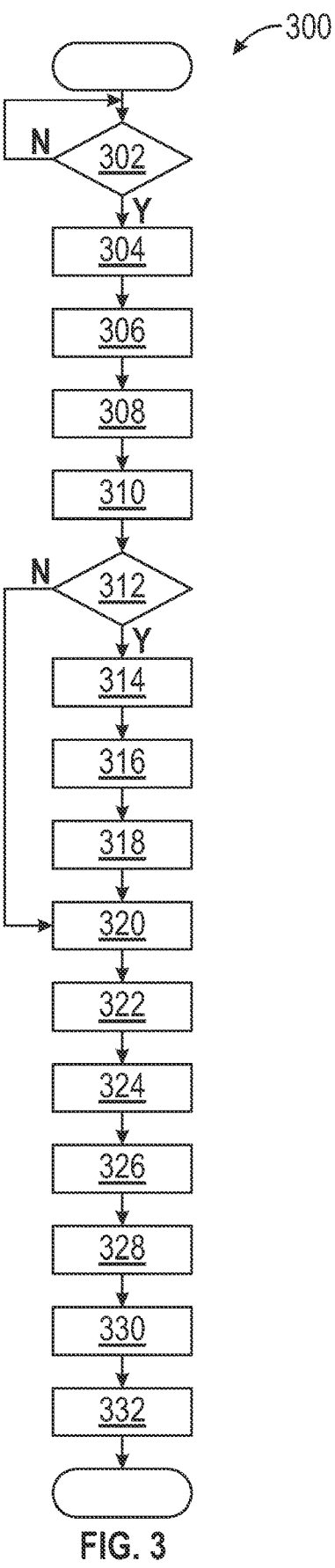
FIG. 3 is a process flow diagram illustrating a method for determining a hands-free task by the disclosed voice recognition system shown in FIG. 1, according to an exemplary embodiment.

FIG. 3 is a process flow diagram illustrating a method 300 for determining and executing the hands-free task by the voice recognition system 12. Referring generally to FIGS. 1-3, the method 300 may begin at decision block 302. In block 302, the noise reduction module 80 of the voice block 70 continuously monitors the microphone 24 for the electrical signal representative of the voice signal generated by the occupant 38. In response to receiving the electrical signal representative of the voice signal generated by the occupant 38, the method 300 proceeds to block 304.

In block 304, the noise reduction module 80 executes one or more noise reduction algorithms that reduce background noise from the electrical signal representative of the voice signal generated by the occupant 38. The method 300 may then proceed to block 306.

In block 306, the voice recognition module 82 of the voice block 70 executes the one or more background noise recognition algorithms that extract background noise in the electrical signal representative of the voice signal generated by the occupant 38. The voice recognition module 82 also executes the one or more speaker recognition algorithms that determine when more than one speaker generates the voice signal. The method 300 may then proceed to block 308.

In block 308, the token generation module 84 of the voice block 70 converts the electrical signal representative of the words spoken by the occupant 38 received from the voice recognition module 82 into the sequence of tokens based on a supervised multicategory machine learning algorithm, where the sequence includes the two or more tokens and each token is assigned a confidence level. The method 300 may then proceed to block 310.

In block 310, the masking module 86 of the voice block 70 compares the confidence level of each token that is part of the sequence of tokens with the threshold confidence level. The method 300 may then proceed to decision block 312.

In decision block 312, in response to determining the confidence level of a specific token of the sequence of tokens is less than the threshold confidence, then the method 300 proceeds to block 314. In block 314, the masking module 86 of the voice block 70 masks the specific token to create a missing token. Otherwise, the method 300 proceeds to block 320.

In block 316, the prediction module 88 of the voice block 70 then executes one or more large language models to predict the contents of the missing token based on context of adjacent tokens that are part of the sequence of tokens. The method 300 may then proceed to block 318.

In block 318, the sentence generation module 90 of the voice block 70 determines the contents of the missing token based on one or more machine learning algorithms to complete the one or more sentences. The method 300 may then proceed to block 320.

In block 320, the sentence generation module 90 of the voice block 70 generates one or more sentences based on the sequence of tokens. The method 300 may then proceed to block 322.

In block 322, the behavior detection module 92 of the intent block 72 executes the one or more eye and body tracking algorithms to determine the one or more occupant intent factors based on the image data representative of the head and the upper body of the occupant 38 from the occupant monitoring system camera 54. The occupant intent factors may include one or more of the following: a point of gaze, a touch point, one or more gestures, and a body position of the occupant 38. The method 300 may then proceed to block 324.

In block 324, the intention module 94 of the intent block 72 executes one or more regression machine learning algorithms to determine the intended action of the occupant 38 based on one or more of the occupant intent factors. The method 300 may then proceed to block 326.

In block 326, the context module 96 of the intent block 72 determines the context of the voice signal generated by the occupant 38 based on the intended action from the intent module 94, the one or more sentences from the voice block 70, the current traffic conditions (if applicable), the current date (if applicable), the current time (if applicable), the conversation history of the occupant 38 (if applicable), and a mood of the occupant. The method 300 may then proceed to block 328.

In block 328, the response generation module 98 of the intent block 72 executes one or more pattern recognition algorithms to determine the hands-free task based on the context of electrical signal representative of the voice signal generated by the occupant 38 from the context module 96, the intended action from the intent module 94, the one or more sentences from the voice block 70, and the conversation history of the occupant 38 (if applicable). The method 300 may then proceed to block 330.

In block 330, the response generation module 98 of the intent block 72 instructs the one or more peripheral systems 28 to execute the hands-free task. In one embodiment, the response generation module 98 may also instruct the speaker 30 to announce the hands-free task based on a computer-generated audio output that represents human voice. The method 300 may then proceed to block 332.

In block 332, the prediction module 100 of the intent block 72 executes one or more history-based large language models to predict an upcoming voice command uttered by the occupant 38 based on the conversation history of the occupant 38 stored in the one or more history databases 106. In embodiments, the prediction module 100 of the intent block 72 instructs the speaker 30 to announce the upcoming command. In the event the upcoming voice command indicates the occupant 38 is requesting a hands-free task, the prediction module 100 instructs an HMI to generate instructions requesting the occupant 38 to confirm the hands-free task. In response to receiving a confirmation by the occupant 38, the prediction module 100 also instructs the one or more peripheral systems 28 to execute the hands-free task. The method 300 may then terminate.

Referring generally to the figures, the disclosed voice recognition system provides various technical effects and benefits. Specifically, the voice recognition system provides an approach to determine a hands-free task based on an utterance of an occupant in combination with an intent of an occupant that is determined based on non-verbal input. In particular, the intent of the occupant is determined based on image data representative of the occupant's the head and the upper body. It is also to be appreciated that the voice recognition system continuously monitors the occupant's speech, and therefore the disclosed voice recognition system does not require an individual to utter an activation or wake-up command. Instead, the voice recognition system may naturally intervene and assist an occupant who is driving or performing another task related to vehicle operation. The voice recognition system may also consider other input, such as traffic conditions, the current data and time, and the conversation history of the occupant when determining the hands-free task.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A voice recognition system, comprising:
   one or more controllers that each include one or more processors that execute instructions to:
   receive an electrical signal representative of a voice signal generated by an occupant and image data representative of a head and an upper body of the occupant;
   convert the electrical signal representative of the words spoken by the occupant into a sequence of tokens based on a supervised multicategory machine learning algorithm, wherein the sequence of tokens includes two or more tokens and wherein each token is assigned a confidence level;
   compare the confidence level of each token that is part of the sequence of tokens with a threshold confidence level;
   in response to determining the confidence level of a specific token of the sequence of tokens is less than the threshold confidence level, mask the specific token to create a missing token;

execute the bidirectional encoder representations from transformers (BERT) model to predict the contents of the missing token based on context of adjacent tokens that are part of the sequence of tokens;
determine the contents of the missing token based on a long short-term memory (LSTM) model to complete one or more sentences:
generate the one or more sentences based on the sequence of tokens;
execute one or more eye and body tracking algorithms to determine one or more occupant intent factors based on the image data representative of the head and the upper body of the occupant;
execute one or more regression machine learning algorithms to determine an intended action of the occupant based on one or more of the occupant intent factors;
determine a context of the voice signal generated by the occupant based on the intended action, the one or more sentences, and a mood of the occupant; and
executes one or more pattern recognition algorithms to determine a hands-free task based on the context of the voice signal generated by the occupant, the intended action, and the one or more sentences.

2. The voice recognition system of claim 1, further comprising:
   one or more peripheral systems in electronic communication with the one or more controllers, wherein the one or more processors of the one or more controllers instruct one of the peripheral systems to execute the hands-free task.

3. The voice recognition system of claim 2, wherein the occupant is located within an interior cabin of a vehicle.

4. The voice recognition system of claim 3, wherein the one or more peripheral systems include one or more of the following: a heating, ventilation, and air conditioning (HVAC) system, a radio, an autonomous driving system, a navigation system, an infotainment system, a lighting system, a personal electronic device, and an intelligent seating system that communicates with the occupant based on haptic feedback.

5. The voice recognition system of claim 1, further comprising:
   a microphone in electronic communication with the one or more controllers that converts the voice signal generated by the occupant into the electrical signal representative of the voice signal.

6. The voice recognition system of claim 5, wherein the one or more processors of the one or more controllers execute instructions to:
   continuously monitor the microphone for the electrical signal representative of the voice signal generated by the occupant.

7. The voice recognition system of claim 1, further comprising:
   an occupant monitoring system including an occupant monitoring system camera in electronic communication with the one or more controllers, wherein the occupant monitoring system camera is positioned to capture image data representative of a head and an upper body of the occupant.

8. The voice recognition system of claim 1, wherein the occupant intent factors include one or more of the following: a point of gaze, a touch point, one or more gestures, and a body position of the occupant.

9. The voice recognition system of claim 1, wherein the context of the voice signal generated by the occupant is determined based on one or more of the following: current traffic conditions, a current date, a current time, and a conversation history.

10. The voice recognition system of claim 1, wherein the one or more processors of the one or more controllers execute instructions to:

determine the mood of the occupant by analyzing the voice signal generated by the occupant based on a trained regression model.

11. The voice recognition system of claim 1, wherein the one or more processors of the one or more controllers execute instructions to:

executes one or more history-based large language models to predict an upcoming voice command uttered by the occupant based on a conversation history of the occupant.

12. A method for determining a hands-free task by a voice recognition system, the method comprising:

receiving, by one or more controllers, an electrical signal representative of a voice signal generated by an occupant and image data representative of a head and an upper body of the occupant;

converting, by the one or more controllers, the electrical signal representative of the words spoken by the occupant into a sequence of tokens based on a supervised multicategory machine learning algorithm, wherein the sequence of tokens includes two or more tokens, and wherein each token is assigned a confidence level;

comparing, by the one or more controllers, the confidence level of each token that is part of the sequence of tokens with a threshold confidence level;

in response to determining the confidence level of a specific token of the sequence of tokens is less than the threshold confidence level, masking, by the one or more controllers, the specific token to create a missing token;

executing, by the one or more controllers, the BERT model to predict the contents of the missing token based on context of adjacent tokens that are part of the sequence of tokens;

determining, by the one or more controllers, the contents of the missing token based on a LSTM model to complete one or more sentences;

generating, by the one or more controllers, the one or more sentences based on the sequence of tokens;

executing, by the one or more controllers, one or more eye and body tracking algorithms to determine one or more occupant intent factors based on the image data representative of the head and the upper body of the occupant;

executing, by the one or more controllers, one or more regression machine learning algorithms to determine an intended action of the occupant based on one or more of the occupant intent factors;

determining a context of the voice signal generated by the occupant based on the intended action, the one or more sentences, and a mood of the occupant; and executing one or more pattern recognition algorithms to determine a hands-free task based on the context of the voice signal generated by the occupant, the intended action, and the one or more sentences.

13. The method of claim 12, further comprising:

instructing a peripheral system to execute the hands-free task.

14. A voice recognition system for a vehicle, comprising:

a microphone that converts a voice signal generated by an occupant of the vehicle into an electrical signal representative of the voice signal;

an occupant monitoring system including an occupant monitoring system camera positioned to capture image data representative of a head and an upper body of the occupant; and one or more controllers in electronic communication with the microphone and the occupant monitoring system camera, wherein the one or more controllers each include one or more processors that execute instructions to:

convert the electrical signal representative of the words spoken by the occupant into a sequence of tokens based on a supervised multicategory machine learning algorithm, wherein the sequence of tokens includes two or more tokens, and wherein each token is assigned a confidence level;

compare the confidence level of each token that is part of the sequence of tokens with a threshold confidence level;

in response to determining the confidence level of a specific token of the sequence of tokens is less than the threshold confidence level, mask the specific token to create a missing token;

execute the bidirectional encoder representations from transformers (BERT) model to predict the contents of the missing token based on context of adjacent tokens that are part of the sequence of tokens;

determine the contents of the missing token based on a long short-term memory (LSTM) model to complete one or more sentences;

generate the one or more sentences based on the sequence of tokens;

execute one or more eye and body tracking algorithms to determine one or more occupant intent factors based on the image data representative of the head and the upper body of the occupant;

execute one or more regression machine learning algorithms to determine an intended action of the occupant based on one or more of the occupant intent factors;

determine a context of the voice signal generated by the occupant based on the intended action, the one or more sentences, and a mood of the occupant; and executes one or more pattern recognition algorithms to determine a hands-free task based on the context of the voice signal generated by the occupant, the intended action, and the one or more sentences.

15. The voice recognition system of claim 14, further comprising:

one or more peripheral systems in electronic communication with the one or more controllers, wherein the one or more processors of the one or more controllers instruct one of the peripheral systems to execute the hands-free task.

16. The voice recognition system of claim 15, wherein the one or more peripheral systems include one or more of the following: a heating, ventilation, and air conditioning (HVAC) system, a radio, an autonomous driving system, a navigation system, an infotainment system, a lighting system, a personal electronic device, and an intelligent seating system that communicates with the occupant based on haptic feedback.

* * * * *